United States Patent
Desprez et al.

(10) Patent No.: US 6,777,917 B2
(45) Date of Patent: Aug. 17, 2004

(54) SUPERCAPACITOR BALANCING METHOD AND SYSTEM

(75) Inventors: Philippe Desprez, Blanquefort (FR); Gérard Barrailh, Gradignan (FR); Pascal Lavaur, Bordeaux (FR); Stéphane Raël, Nancy (FR); Fadi Sharif, Maizieres (FR); Bernard Davat, Nancy (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/171,970

(22) Filed: Jun. 17, 2002

(65) Prior Publication Data

US 2003/0020435 A1 Jan. 30, 2003

(30) Foreign Application Priority Data

Jun. 18, 2001 (FR) .............................. 01 07959
May 16, 2002 (FR) .............................. 02 06037

(51) Int. Cl.[7] .............................................. H01M 10/44
(52) U.S. Cl. ...................... 320/167; 320/120; 320/122
(58) Field of Search ................................. 320/167, 166, 320/132, 136, 104, 105, 118, 119, 122, 120, 117, 139

(56) References Cited

U.S. PATENT DOCUMENTS 5,642,027 A * 6/1997 Windes et al. .............. 320/166
5,850,136 A * 12/1998 Kaneko ..................... 320/119

* cited by examiner

Primary Examiner—Rajnikant B. Patel
(74) Attorney, Agent, or Firm—Sughrue Mion, PLLC

(57) ABSTRACT

The present invention relates to a method of and a system for charging at least one supercapacitor that is particularly suitable for balancing supercapacitors. The method includes a step (22) of bypassing the current flowing in the supercapacitor so that, when the voltage (V) at the terminals of said supercapacitor reaches a threshold voltage ($V_S$), the bypass current ($I_{BP}$) assumes a maximum value, which method is characterized in that it includes a step (21) of monitoring of the charging current ($I_C$) of said supercapacitor as a function of the voltage (V) at the terminals of said supercapacitor by a voltage detector logic function ($F_0$) able to change from an activated state to a deactivated state when the voltage (V) at the terminals of said supercapacitor exceeds a first predefined voltage ($V_{OH}$) greater than the threshold voltage ($V_S$) and then to return to the activated state when said voltage (V) at the terminals of said supercapacitor falls below a second predefined voltage ($V_{OB}$) less than or equal to said first predefined voltage ($V_{OH}$).

17 Claims, 4 Drawing Sheets

SUPERCAPACITOR BALANCING METHOD AND SYSTEM

BACKGROUND OF THE INVENTION

The present invention relates to a method and a system for charging one or more supercapacitors, more particularly suitable for balancing supercapacitors.

Supercapacitors are known in the art and are currently being developed as power sources in high-power applications such as engine starting, power top-up for hybrid vehicle motors, and uninterruptible power supplies. In applications like these, power supplies are needed that can be charged quickly and can perform a very large number of cycles, which is the case with supercapacitors, but not with traditional batteries.

Supercapacitors are capable of delivering very high specific powers over short time periods. The characteristic discharging (or charging) time of a supercapacitor is of the order of a few seconds to a few tens of seconds, during which time specific powers exceeding 1 kW/kg can be delivered. Individual supercapacitors have a capacitance from 1 F to approximately 3,500 F and a very low resistance, of less than 1 mΩ for components with the highest capacity.

When charging supercapacitors, it is important not to exceed a maximum voltage at the terminals of the supercapacitor. Controlling the charging of a supercapacitor so that charging is stopped if the voltage at the terminals reaches a predetermined value is known in the art. If the voltage exceeds this predetermined value, aging of the supercapacitor is accelerated, which reduces its autonomy and power.

A supercapacitor module generally comprises a plurality of supercapacitors connected in series. The applications mentioned above generally require voltages exceeding a few tens of volts, or even a few hundreds of volts. In this case, at the end of charging the supercapacitor module, a spread of the characteristics of the supercapacitors relative to each other is observed, and this applies in particular to the voltage at the terminals of the supercapacitors. This is due to a spread of the intrinsic properties (series resistance and capacitance) of each supercapacitor in the module, to aging of the supercapacitors, and possibly to a temperature gradient within the module, due to its environment. This leads to different leakage currents for each of the supercapacitors of the module and therefore to different end of charging voltages for each of the supercapacitors.

This problem compromises correct operation of the supercapacitor module. Some supercapacitors of the module may reach voltages exceeding their nominal charging voltage, which degrades their characteristics and leads to premature aging. Thus the module as a whole cannot function correctly.

To solve this problem, the document EP-0 564 149 proposes to connect a bypass circuit in parallel with the terminals of each supercapacitor of a module comprising several supercapacitors, the bypass circuit comprising an MOS transistor that changes state at a predefined voltage at the terminals of the supercapacitor to bypass a nominal bypass current.

However, this causes problems. The bypass circuit implies the use of a charging current equal to the nominal bypass current at the end of charging. If the charging of a supercapacitor continues at a current much higher than the nominal bypass current, the supercapacitor may be overcharged, reducing its service life. Consequently, using a low charging current equal to the nominal bypass current will very greatly increase the duration of the end of charging period.

SUMMARY OF THE INVENTION

The present invention aims to provide a supercapacitor charging method enabling charging of the supercapacitor to continue at a current higher than the nominal bypass current after the bypass circuit has begun to bypass the current, thereby reducing the duration of the end of charging period.

The remainder of the description refers to balancing in relation to a supercapacitor module and a supercapacitor in isolation, in which case it is more a question of monitoring the charging voltage of the supercapacitor.

To this end the present invention proposes a method of charging at least one supercapacitor including a step of bypassing the current flowing in said supercapacitor so that, when the voltage at the terminals of said supercapacitor reaches a predetermined value, constituting a threshold voltage, the bypass current assumes a maximum value constituting a nominal bypass current, which method is characterized in that it includes a step of monitoring of the charging current of said supercapacitor as a function of the voltage at the terminals of said supercapacitor by a voltage detector logic function, constituting an optimization function, able to change from an activated state to a deactivated state when the voltage at the terminals of said supercapacitor exceeds a first predefined voltage greater than the threshold voltage and then to return to the activated state when said voltage at the terminals of said supercapacitor falls below a second predefined voltage less than or equal to said first predefined voltage.

Thanks to the invention, charging of the supercapacitor can continue at a current greater than the nominal bypass current after bypassing has started, with the charging current monitored as a function of the voltage at the terminals of the supercapacitor to eliminate the risk of exceeding a predefined voltage that can reduce the service life of the supercapacitor. The method according to the invention therefore optimizes the charging time without damaging the supercapacitor.

The signal delivered by said optimization function is advantageously a hysteresis signal.

One embodiment of the method includes a step of charging said supercapacitor with a charging current greater than said nominal bypass current and maintaining said charging step for as long as said optimization logic function is in the activated state.

Advantageously, when the voltage at the terminals of said supercapacitor returns to a voltage value, constituting a reference voltage, which is less than the value of said threshold voltage, the bypass current assumes a value very much less than a current corresponding to the leakage current of said supercapacitor.

In a different embodiment, the characteristic of the bypass current as a function of the voltage at the terminals at said supercapacitor is a hysteresis signal.

The binary nature of the bypass current as a function of the voltage at the terminals of the supercapacitor thus has a hysteresis shape and improves stability in the event of variation in the voltage of the supercapacitor, for example due to a sudden variation in the charging current.

In one embodiment, the method includes a step of filtering high-frequency harmonics of said voltage at the terminals of said supercapacitor.

Thus using a low-pass filter filters out high-frequency harmonics of the voltage at the terminals of the supercapacitor induced by high-frequency switching of the charging current.

One embodiment of the method includes a step of reinitializing of the charger as a function of the voltage at the terminals of the supercapacitor by a voltage detector logic function, constituting a reinitialization function, able to change from an activated state to a deactivated state when the voltage at the terminals of said supercapacitor exceeds a third predefined voltage less than or equal to said first predefined voltage and then to return to said activated state when said voltage at the terminals of said supercapacitor falls below a fourth predefined voltage less than said second predefined voltage.

The method advantageously includes a step of detection of a minimum safety voltage at the terminals of the supercapacitor by a voltage detector logic function, constituting a minimum voltage detector function, able to change from an activated state to a deactivated state when the voltage at the terminals of said supercapacitor exceeds a fifth predefined voltage and to return to the activated state when said voltage at the terminals of said supercapacitor falls below a sixth predefined voltage.

Thus if the voltage at the terminals of the supercapacitor becomes very low (discharging), the detector function reduces the discharge current.

The charging method advantageously includes a step of charging a plurality of supercapacitors, characterized in that said optimization function changes from an activated state to a deactivated state when at least one of the voltages at the terminals of said supercapacitors exceeds said first predefined voltage and returns to the activated state when each of the voltages at the terminals of said supercapacitors falls below said second predefined voltage.

The charging method advantageously including a step of charging a plurality of supercapacitors is characterized in that said reinitialization function changes from an activated state to a deactivated state when at least one of the voltages at the terminals of said supercapacitors exceeds said third predefined voltage and returns to the activated state when each of the voltages at the terminals of said supercapacitors falls below said fourth predefined voltage.

The charging method advantageously including a step of charging a plurality of supercapacitors is characterized in that said minimum voltage detector function changes from an activated state to a deactivated state when each of the voltages at the terminals of said supercapacitors exceeds said fifth predefined voltage and returns to the activated state when at least one of the voltages at the terminals of said supercopacitors falls below said sixth predefined voltage.

The charging method advantageously including a step of charging a plurality of supercapacitors includes a step of detection of dispersion of the voltage at the terminals of said supercapacitors by a voltage detector logic function, constituting a dispersion detector function, characterized in that said dispersion detector function changes from an activated state to a deactivated state when each of the voltages at the terminals of said supercapacitors exceeds a seventh predefined voltage and returns to the activated state when at least one of the voltages at the terminals of said supercapacitors falls below an eighth predefined voltage.

The combination of the end of charge optimization function and this dispersion detector function detects significant imbalance of the voltages at the terminals of the supercapacitors in a supercapacitor module.

Finally, the present invention also provides a system for implementing the method according to any preceding claim, which system comprises:

at least one supercapacitor, a bypass circuit comprising a transistor operating in switching mode and connected in parallel with the terminals of said supercapacitor, charging means, and a detector unit delivering at least one logic signal representing the voltage at the terminals of said supercapacitor, said logic signal being supplied to said charging means.

The system advantageously comprises a low-pass filter connected in parallel with the terminals of said supercapacitor.

A first embodiment of the system includes a plurality of supercapacitors connected in series, a bypass circuit being connected in parallel to the terminals of each of said supercapacitors.

A second embodiment of the system includes a plurality of supercapacitors connected in series, a single bypass circuit being connected in parallel to the terminals of all of said supercapacitors.

A third embodiment of the system includes a plurality of supercapacitors connected in parallel, a single bypass circuit being connected in parallel to the terminals of all of said supercapacitors.

Other features and advantages of the present invention will become apparent in the course of the following description of one embodiment of the invention, which is given by way of illustrative and non-limiting example.

DETAILED DESCRIPTION OF THE INVENTION

In all the figures, common elements carry the same reference numbers.

Figure 1:
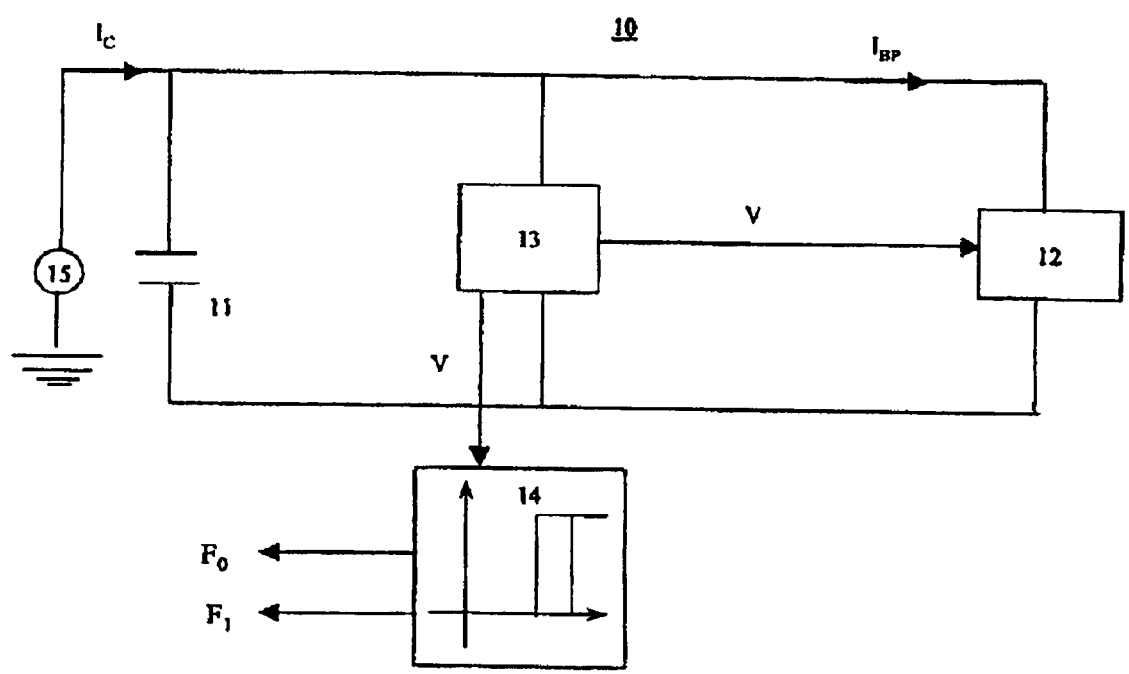
FIG. 1 shows the theoretical diagram of a charging system for implementing the method according to the invention on an individual supercapacitor.

FIG. 1 shows a charging system 10 according to the invention comprising a supercapacitor 11 in parallel with the terminals of which is connected a bypass circuit 12 in which flows a bypass current $I_{BP}$, the circuit 12 comprising an MOS power transistor operating in switching mode. A low-pass filter 13 is connected in parallel to the terminals of the supercapacitor 11. The low-pass filter 13 is necessary in the event of high-frequency switching of the charging current $I_c$, which generates harmonic voltages that could degrade correct operation of the bypass circuit 12. Finally, a detector unit 14 connected to the filter 13 generates two charge management logic functions $F_0$ and $F_1$, respectively constituting an optimization function and a reinitialization function, interpretation of which by the charger 15 for charging the supercapacitor 11 optimizes the charging time without damaging the supercapacitor and reinitializes the charger. The filter 13 generates a filtered voltage V representing the voltage at the terminals of the supercapacitor 11 without harmonic voltages. The voltage V controls the circuit 12 and the unit 14.

Figure 2:
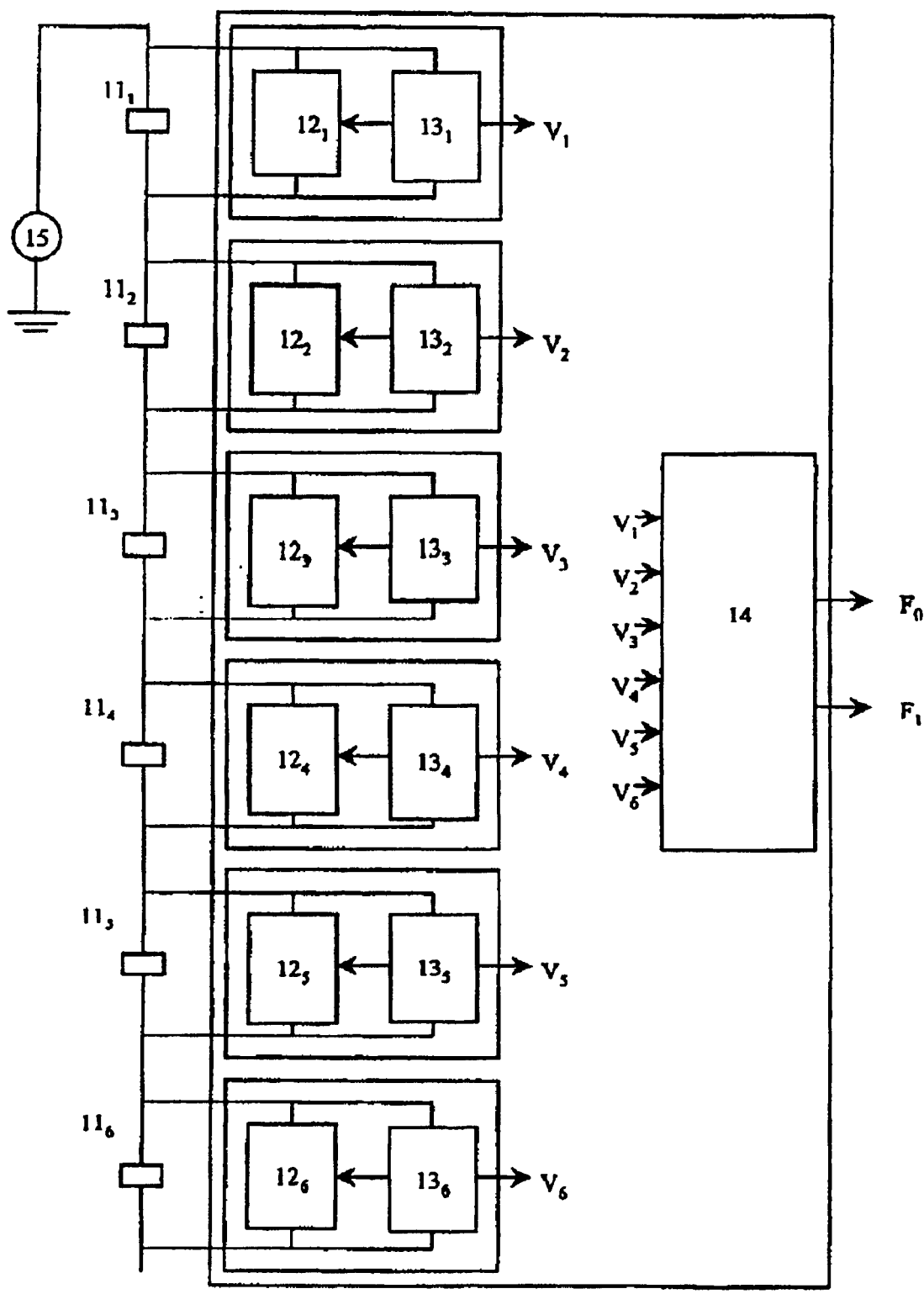
FIG. 2 shows the theoretical diagram of a charging system for implementing the method according to the invention on a module comprising a plurality of supercapacitors.

FIG. 2 shows a system 20 for charging a supercapacitor module comprising a plurality of circuits $10_1$ to $10_6$ like that from FIG. 1 (six such circuits in the FIG. 2 example). Each element of a circuit $10_n$ (n varying from 1 to 6 in the FIG. 2 example) includes the same elements as the circuit 10 from FIG. 1, with the same reference number having a suffix corresponding to the rank of the circuit in the module 20. The charger 15 and the detector unit 14 are common to all the supercapacitors $11_1$ to $11_6$.

According to the invention, the output voltages $V_i$ of the circuit $10_i$ are combined in the detector unit 14 to generate the logic functions $F_0$ and $F_1$ which are sent to the charger 15.

The operation of the bypass circuit 12 (or $12_1$ to $12_6$) during charging in accordance with the invention is explained next with reference to FIGS. 3 and 4.

Figure 3:
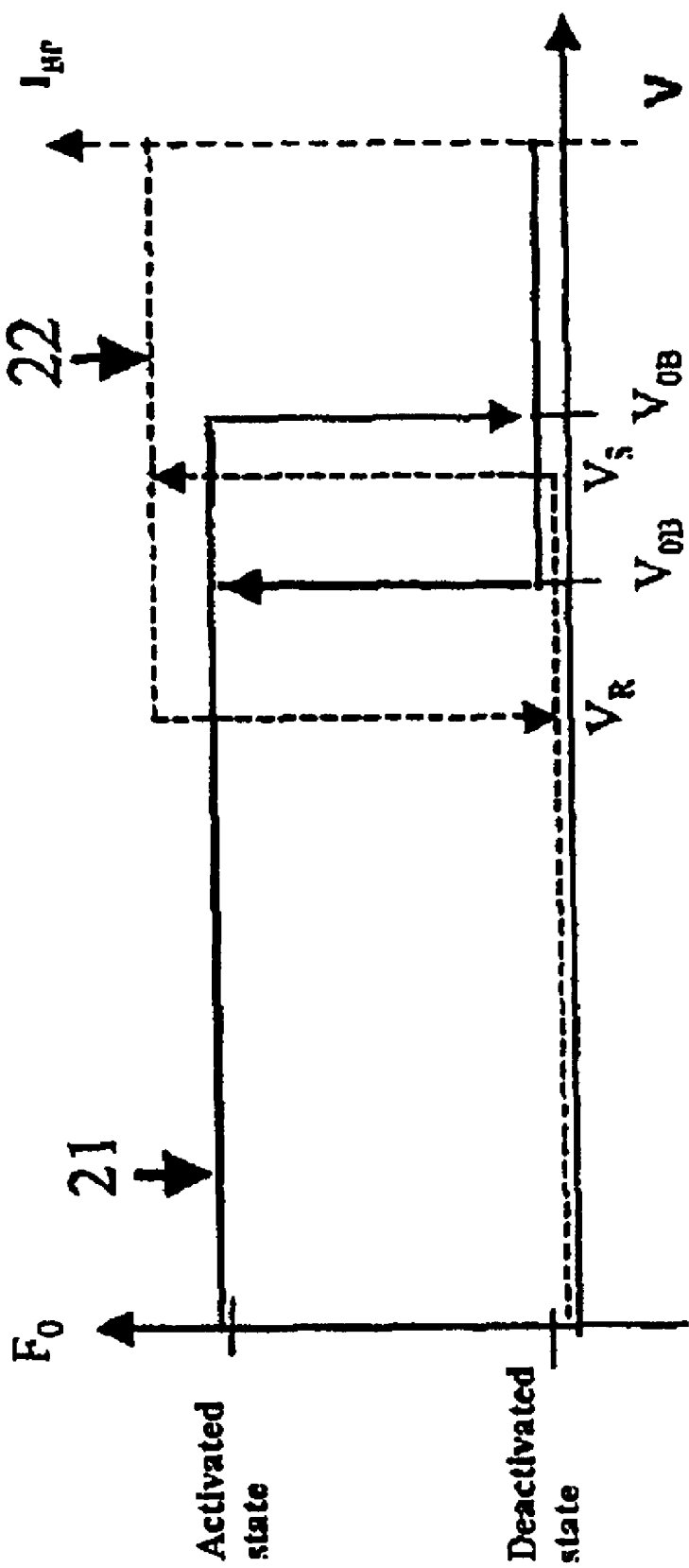
FIG. 3 shows one example of the characteristic curves of the bypass current and the optimization function of the method according to the invention as a function of the voltage at the terminals of the supercapacitor.

FIG. 3 shows one example of the characteristic curves of the bypass current $I_{BP}$ and the optimization function $F_0$ of the method according to the invention as a function of the voltage V at the terminals of the supercapacitor.

The continuous line curve 21 represents the optimization function $F_0$ as a function of the voltage V at the terminals of the supercapacitor.

The dashed line curve 22 represents the bypass current $I_{BP}$ as a function of the voltage V at the terminals of the supercapacitor.

The hysteresis-shaped characteristic of the bypass current as a function of the voltage V includes the following regions:

While the voltage V is less than a threshold voltage $V_S$, the branch current $I_{BP}$ is very much lower than the leakage current of the supercapacitor 11.

As soon as the voltage V reaches the voltage $V_S$, the transistor of the bypass circuit 12 changes state and the branch current $I_{BP}$ takes a particular value of the order of a few hundred milliamperes to a few amperes.

When the voltage V falls again below a reference voltage $V_R$, the bypass current is again less than the leakage current of the supercapacitor 11.

The hysteresis-shaped characteristic of the logic function $F_0$ delivered by the detector unit 14 as a function of the voltage V includes the following regions:

While the voltage V is less than a predefined first voltage $V_{OH}$, $F_0$ is activated, i.e. $F_0$ has a voltage value equal to a few volts corresponding to binary 1. $V_{OH}$ is a voltage higher than the threshold value $V_s$.

As soon as V reaches $V_{OH}$, $F_0$ takes a virtually zero value and therefore goes to a deactivated state corresponding to binary 0.

When V falls again below a second predefined voltage $V_{OB}$, $F_0$ goes to the activated state corresponding to binary 1.

FIG. 3 is described above with reference to FIG. 1. In the case of a plurality of supercapacitors $11_1$ to $11_6$ as described with reference to FIG. 2, the optimization function $F_0$ goes from an activated state to a deactivated state if at least one of the voltages at the terminals of the supercapacitors exceeds the first predefined voltage $V_{OH}$ and returns to the activated state if each of the voltages $V_1$ to $V_6$ at the terminals of said supercapacitors falls below said second predefined voltage $V_{OB}$.

Figure 4:
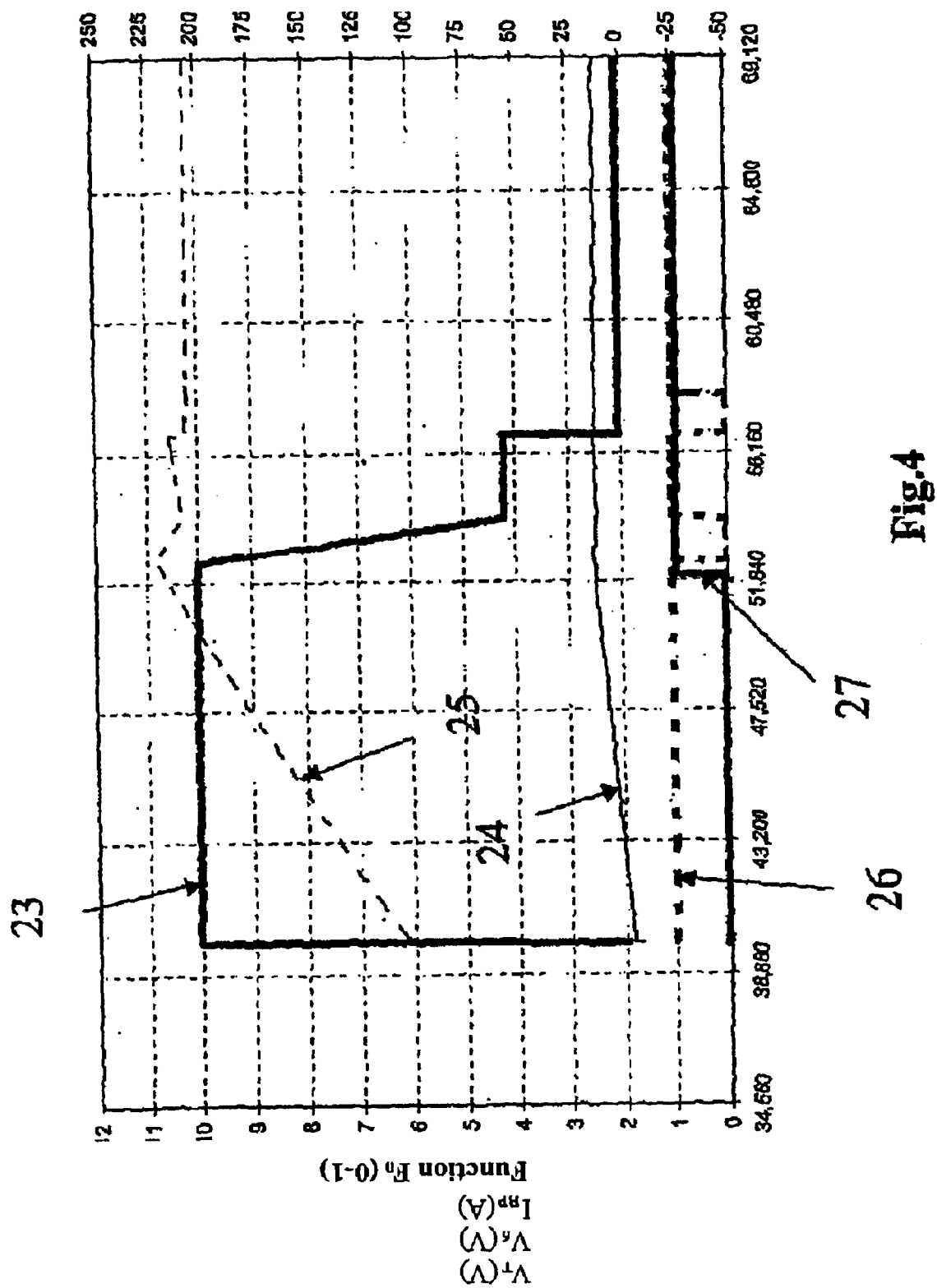
FIG. 4 shows one example of a curve representing the voltage at the terminals of a supercapacitor module, the charging current of a supercapacitor module, the voltage at the terminals of one of the supercapacitors of the module, the bypass current, and the optimization function as a function of the charging time when using a method according to the invention.

FIG. 4 shows one example of a curve representing the voltage $V_T$ at the terminals of a module comprising six supercapacitors, such as that shown in FIG. 2, the charging current $I_C$ of the supercapacitor module, the voltage $V_6$ at the terminals of the supercapacitor $11_6$, the bypass current $I_{BP}$ corresponding to the circuit $10_6$, and the optimization function $F_0$ as a function of the charging time when using a method according to the invention.

The dashed line curve 25 represents the voltage $V_T$ at the terminals of the supercapacitor module as a function of the charging time.

The thick continuous line curve 23 represents the charging current $I_C$ of the supercapacitor module as a function of the charging time.

The continuous line curve 24 represents the voltage $V_6$ at the terminals of the supercapacitor $11_6$ as a function of the charging time.

The continuous line curve 27 represents the bypass current $I_{BP}$ corresponding to the circuit $10_6$ as a function of the charging time.

The thick dashed line curve 26 represents the optimization function $F_0$ as a function of the charging time.

The predefined voltages are chosen as follows:

$V_S$=2.5 V $V_R$=2.48 V $V_{OB}$=2.5 V $V_{OH}$=2.53 V

Charging is effected in a series of phases:

Phase 1

The charging current $I_C$ is constant and equal to approximately 200 A. The supercapacitor $11_6$ is charged, which implies a progressive increase in the voltage $V_6$ and the total voltage $V_T$. The function $F_0$ is in the activated state. The bypass current is close to zero and in any event very much less than the leakage current of the supercapacitors.

Phase 2

When the voltage $V_6$ reaches $V_{SS}$=2.5 V, the circuit $12_6$ begins to bypass the current and $I_{BP}$ takes a constant value constituting a nominal bypass current equal to 1 A. The function $F_0$ is still in the activated state, indicating to the charger 15 that it can maintain a charging current of 200 A.

Phase 3

When the voltage $V_6$ reaches $V_{OH}$=2.53 V, $F_0$ goes to the deactivated state, which indicates to the charger 15 that it must reduce the charging current: the charging current is ramped down in accordance with a linear current ramp from 200 A to approximately 55 A. At the same time, $V_6$ and $V_T$ decrease until $V_6$ is again less than $V_{OB}$=2.5 V. $F_0$ then goes to the activated state.

Phase 4

The supercapacitors are charged again at a current equal to approximately 55 A. This phase again implies an increase in $V_6$ and $V_T$. When the voltage $V_6$ again reaches the value $V_{OH}$=2.53 V, $F_0$ returns to the deactivated state, which indicates to the charger 15 that it must reduce the charging current, which is changed to a value close to zero.

The charging protocol as described above enables charging of the supercapacitor to continue at a current greater than the nominal bypass current, which is equal to 1 A, when bypassing has started; monitoring the charging current as a function of the voltage at the terminals of the supercapacitor, by means of the logic function $F_0$, which controls the charger, eliminates the risk of exceeding a predefined voltage that could reduce the service life of the supercapacitor.

Other logic functions, not shown, can be used to control the charger 15.

Accordingly, referring to FIG. 1, the charger reinitialization function $F_1$ can change from an activated state to a deactivated state if the voltage V at the terminals of the supercapacitor 11 exceeds a third predefined voltage less than or equal to the first predefined voltage $V_{OH}$ and then return to the activated state if the voltage V at the terminals of the supercapacitor 11 falls below a fourth predefined voltage less than said second predefined voltage $V_{OB}$.

In the case of a plurality of supercapacitors $11_1$ to $11_6$ as described with reference to FIG. 2, the optimization function $F_1$ changes from an activated state to a deactivated state if at least one of the voltages $V_1$ to $V_6$ at the terminals of the supercapacitors $11_1$ to $11_6$ exceeds the third predefined voltage and returns to the activated state if each of the voltages $V_1$ to $V_6$ at the terminals of said supercapacitors $11_1$ to $11_6$ falls below the fourth predefined voltage.

Of course, the embodiments just described are provided by way of illustrative example only.

In particular, the characteristic of the charging current as described above has a portion in the form of a current ramp, but its shape could obviously be entirely different, for example a staircase shape using a plurality of current levels each of which is constant as a function of time.

Similarly, an MOS transistor is selected for the bypass circuit, but it is clear that any type of transistor operating in switching mode, such as IGBT, can be used.

All the above numerical examples are merely to illustrate the method according to the invention, and the values specified therein have no limiting effect on the invention.

All embodiments of the invention apply equally well to monitoring the charging of a single supercapacitor and to balancing a module comprising several supercapacitors.

Finally, any means described can be replaced by equivalent means without departing from the scope of the invention.

What is claimed is:

1. A method of charging at least one supercapacitor comprising steps of:
   bypassing the current flowing in said supercapacitor so that, when the voltage at the terminals of said supercapacitor reaches a predetermined value, constituting a threshold voltage, the bypass current assumes a maximum value constituting a nominal bypass current,
   monitoring of a charging current of said supercapacitor as a function of the voltage at the terminals of said supercapacitor by a voltage detector logic function,
   wherein said voltage detector logic function comprises an optimization function, capable of changing from an activated state to a deactivated state when the voltage at the terminals of said supercapacitor exceeds a first predefined voltage greater than the threshold voltage and then capable of returning to the activated state when said voltage at the terminals of said supercapacitor falls below a second predefined voltage less than or equal to said first predefined voltage.

2. The charging method according to claim 1, wherein said signal delivered by said optimization function is a hysteresis signal.

3. The charging method according to claim 1, further comprising a step of charging said supercapacitor with a charging current greater than said nominal bypass current and maintaining said charging step for as long as said optimization logic function is in the activated state.

4. The charging method according to claim 1, further comprising a step such that, when the voltage at the terminals of said supercapacitor returns to a voltage value, constituting a reference voltage, which is less than the value of said threshold voltage, the bypass current assumes a value very much less than a current corresponding to the leakage current of said supercapacitor.

5. The charging method according to claim 4, wherein the characteristic of the bypass current as a function of the voltage at the terminals at said supercapacitor is a hysteresis signal.

6. The charging method according to claim 1, further comprising a step of filtering high-frequency harmonics of said voltage at the terminals of said supercapacitor.

7. The charging method according to claim 1, further comprising a step of reinitializing of the charger as a function of the voltage at the terminals of the supercapacitor by a voltage detector logic function, constituting a reinitialization function, able to change from an activated state to a deactivated state when the voltage at the terminals of said supercapacitor exceeds a third predefined voltage less than or equal to said first predefined voltage and then to return to said activated state when said voltage at the terminals of said supercapacitor falls below a fourth predefined voltage less than said second predefined voltage.

8. The charging method according to claim 1, further comprising a step of detection of a minimum safety voltage at the terminals of the supercapacitor by a voltage detector logic function, constituting a minimum voltage detector function, able to change from an activated state to a deactivated state when the voltage at the terminals of said supercapacitor exceeds a fifth predefined voltage and to return to the activated state when said voltage at the terminals of said supercapacitor falls below a sixth predefined voltage.

9. The charging method according to claim 1, further comprising a step of charging a plurality of supercapacitors, wherein said optimization function changes from an activated state to a deactivated state when at least one of the voltages at the terminals of said supercapacitors exceeds said first predefined voltage and returns to the activated state when each of the voltages at the terminals of said supercapacitors falls below said second predefined voltage.

10. The charging method according to claim 7, wherein said reinitialization function changes from an activated state to a deactivated state when at least one of the voltages at the terminals of said supercapacitors exceeds said third predefined voltage and returns to the activated state when each of the voltages at the terminals of said supercapacitors falls below said fourth predefined voltage.

11. The charging method according to claim 9, wherein said minimum voltage detector function changes from an activated state to a deactivated state when each of the voltages at the terminals of said supercapacitors exceeds said fifth predefined voltage and returns to the activated state when at least one of the voltages at the terminals of said supercapacitors falls below said sixth predefined voltage.

12. The charging method according to claim 9, further comprising a step of detection of dispersion of the voltage at the terminals of said supercapacitors by a voltage detector logic function, constituting a dispersion detector function, wherein said dispersion detector function changes from an activated state to a deactivated state when each of the voltages (Vi) at the terminals of said supercapacitors exceeds a seventh predefined voltage and returns to the activated state when at least one of the voltages at the terminals of said supercapacitors falls below an eighth predefined voltage.

13. A system for implementing the method according to claim 1, comprising:
- at least one supercapacitor,
- a bypass circuit comprising a transistor operating in switching mode and connected in parallel with the terminals of said supercapacitor,
- charging means, and
- a detector unit delivering at least one logic signal representing the voltage at the terminals of said supercapacitor, said logic signal being supplied to said charging means.

14. The system according to claim 13, comprising a low-pass filter connected in parallel with the terminals of said supercapacitor.

15. The system according to claim 13, further comprising a plurality of supercapacitors connected in series, a bypass circuit being connected in parallel to the terminals of each of said supercapacitors.

16. The system according to claim 13, further comprising a plurality of supercapacitors connected in series, a single bypass circuit being connected in parallel to the terminals of all of said supercapacitors.

17. The system according to claim 13, further comprising a plurality of supercapacitors connected in parallel, a single bypass circuit being connected in parallel to the terminals of all of said supercapacitors.

* * * * *